United States Patent [19]

Kitagawa et al.

[11] Patent Number: 4,630,491
[45] Date of Patent: Dec. 23, 1986

[54] LOAD CELL AND METHOD OF COMPENSATING THE SAME

[75] Inventors: Tohru Kitagawa; Koichiro Sakamoto; Yasuhiro Ushijima, all of Mishima, Japan

[73] Assignee: Tokyo Electric Co., Ltd., Tokyo, Japan

[21] Appl. No.: 721,408

[22] Filed: Apr. 9, 1985

[30] Foreign Application Priority Data

Apr. 9, 1984 [JP] Japan .................................. 59-70480

[51] Int. Cl.[4] ............................................... G01L 1/22
[52] U.S. Cl. ............................... 73/862.67; 73/766; 73/776; 338/2; 338/195; 219/121 LJ
[58] Field of Search ............ 73/765, 766, 776, 862.63, 73/862.67; 219/121 LJ; 338/2-6, 9, 195, 308; 29/610 SG, 620

[56] References Cited

U.S. PATENT DOCUMENTS

| | | | |
|---|---|---|---|
| 4,306,217 | 12/1981 | Solow | 338/308 X |
| 4,329,878 | 5/1982 | Utner et al. | 73/766 |
| 4,432,247 | 2/1984 | Takeno et al. | 73/766 X |

*Primary Examiner*—Charles A. Ruehl
*Attorney, Agent, or Firm*—Oblon, Fisher, Spivak, McClelland & Maier

[57] ABSTRACT

A load cell has strain gage resistors, lead portions for connecting them in a bridge and compensating portions for the compensation of the bridge balance, span or the like, which are laminated as metal thin films by means of the thin film technique. A protection film is formed over the metal thin films and trimmed by laser beams, and the protection film is made of a pigmented protection film made of synthetic resin for easy and accurate trimming.

4 Claims, 3 Drawing Figures

LOAD CELL AND METHOD OF COMPENSATING THE SAME

BACKGROUND OF THE INVENTION

1. Field of the Invention

This invention concerns a load cell in which strain gage resistors, lead portions and the like are formed by lamination by utilizing thin film techniques, as well as a method of compensating the same.

2. Description of the Prior Art

Heretofore, in the load cell of this kind, four strain gage resistor portions, lead portions for their bridge connections and compensating portions for the compensation of bridge balance, span or the like are formed with thin metal films on an insulation film formed on one side of a beam, and the thin metal films at the compensating portions are trimmed upon adjustment after assembling. Although the trimming is carried out by machining using a cutter or the like, it involves the drawback of injuring the underlying insulation film, being poor in the workability and causing defective insulation. Particularly, in a case where the thin metal films are coated with a protection film, trimming also has to be carried out on the protection film, which further worsens the workability.

OBJECT OF THE INVENTION

The first object of this invention is to perform the compensation with ease by trimming the compensating portions formed by the thin film technique by the utilization of laser beams.

The second object of this invention is to use a protection film capable of easily absorbing the laser beams, thereby surely performing the trimming work.

The third object this invention is to prevent the insulation films in contact with the beams from being damaged.

Other objects of this invention will be made clearer by the following descriptions.

EMBODIMENT OF THE INVENTION

Figure 1:
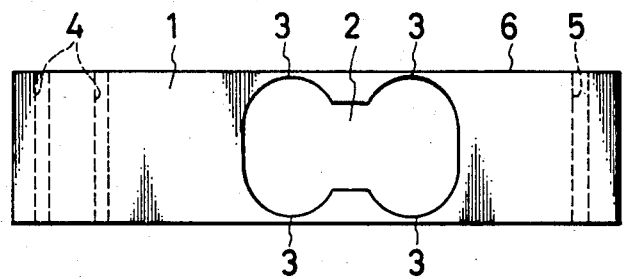
FIG. 1 is a side elevational view of a beam showing one embodiment according to this invention.
Figure 2:
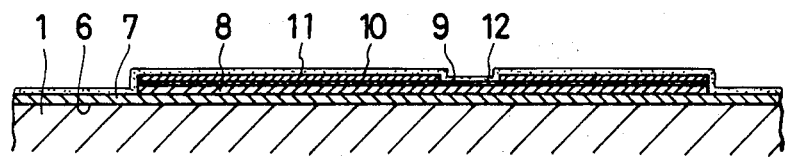
FIG. 2 is an enlarged side elevational view for the laminated state of metal thin films, an insulation film and a protection film.

This invention will now be described referring to one embodiment in conjunction with the drawings. A beam 1 is prepared by machining stainless steel or high strength aluminum material. The beam 1 is formed with an opening 2 to define thin-walled strain-causing portions 3 at four positions, and further formed with mounting holes 4 for mounting to the base of a balance (not illustrated) and a connection hole 5 for mounting a loading plate (not illustrated) of the balance.

On the pattern forming face 6 at the upper surface of the beam 1, are successively laminated an insulation film 7, a thin metal film 8 made of NiCrSi, a thin metal film 9 made of NiCrSi+Ti and a thin metal film 10 made of Au or the like, by means of vapor deposition or sputtering.

Figure 3:
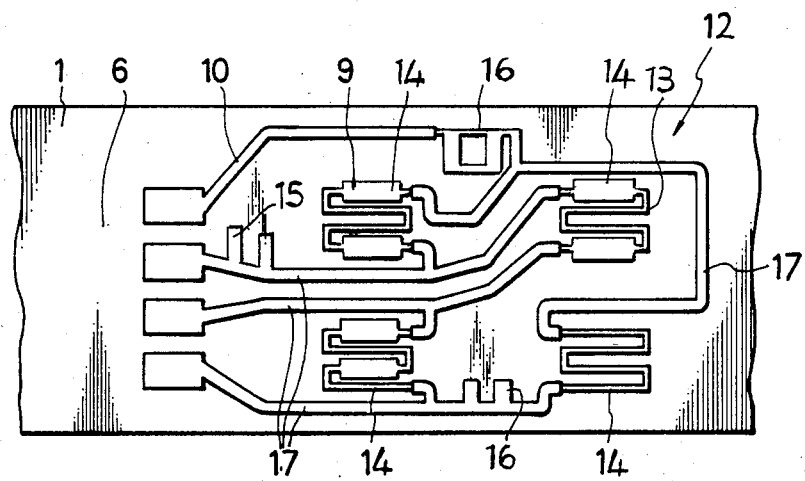
FIG. 3 is a plan view showing the pattern of a bridge circuit.

Then, a pattern 12 as shown in FIG. 3 is formed by selectively etching these thin metal films, 8, 9 and 10. Specifically, there are formed four strain gage resistor portions 13 in the thin metal film 8 each being of about $0.1\mu$ thickness, and bridge balance compensating portions 14, as well as compensating portions 15, 16 made of the thin metal film 9 of about $0.1\mu$ thickness and lead portions 17 made of the thin metal film 10 of about $0.1\mu$ thickness. The compensating portion 15 is used for span temperature compensation and the compensating portion 16 is used for the temperature compensation of the bridge balance. The lead portions 17 serve as the bridge coupling of the strain gage resistor portions 13 and the compensating portions 14, 15 and 16. After applying the etching in this way, a protection film 11 is covered over the thin metal films 8, 9 and 10. The protection film 11 is prepared by coating a polyimide resin of about $10\mu$ thickness and incorporated with a black pigment such as carbon or ferrite in order to facilitate the absorption of laser beams. The pigment may instead be red or yellow, or a mixture of two or more of the above colors. The insulation film 7 of about $10\mu$ thickness is also made of a polyimide resin but of colorless transparent material.

In such a structure, the compensating portions 15 and 16 are cut as required by the laser beams to adjust the value of the resistance. In this case, the protection film corresponding to the cut portions of the compensating portions 15 and 16 is also cut partially. Those portions applied with the laser beams are heated to a high temperature and vaporized. However, since they may not be evaporated completely, they are blown out by using air or $N_2$ gas. While trimming is carried out in this way, there is no risk of injuring the insulation film 7, as in the case of the machining, due to a slight error or deviation in the feed amount of a cutting blade. Particularly, since the insulation film is colorless and transparent, it is not destroyed even if the laser beams are applied for for somewhat longer period. As a result, trimming work can be carried out extremely easily and the deterioration in the insulation can also be prevented. Further, since the thin metal films 8, 9, 10, other than the trimmed portion, are coated with the protection film 11, they are not corroded and can maintain stable characteristics for a long period of time.

What is claimed is:

1. A method of compensating a load cell which comprises the steps of:

laminating layers of thin metal films to form strain gage resistor portions, lead portions for bridge coupling of said resistor portions and compensating portions, forming a pigmented protection film on said thin metal films, and applying laser trimming to the thin metal films from above the protection film, whereby energy absorbtion is enhanced in said laser trimming step.

2. A laser trimmable load cell comprising:

a colorless and transparent insulation film formed on a beam having thin-walled strain causing portions, at least four strain gage resistor portions, and lead portions for bridge coupling of said resistor portions and compensating portions made of thin metal films laminated on said insulation film, wherein said thin metal films are covered with a protection film made of a synthetic resin having a pigment incorporated therein, whereby laser energy absorbtion is enhanced.

3. The load cell as defined in claim 2, wherein said pigment is one of the group consisting of black, red, yellow and a mixture thereof.

4. The load cell as defined in claim 2, wherein said pigment is one from the group consisting of carbon and ferrite, and wherein said synthetic resin is polyimide.

* * * * *